United States Patent
Schinner (10) Patent No.: US 7,403,227 B2
(45) Date of Patent: Jul. 22, 2008

(54) DIGITAL CAMERA THAT AUTOMATICALLY ADJUSTS LCD BRIGHTNESS ACCORDING TO AMBIENT LIGHT

(75) Inventor: Charles E. Schinner, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 794 days.

(21) Appl. No.: 10/959,391

(22) Filed: Oct. 6, 2004

(65) Prior Publication Data
US 2005/0046728 A1    Mar. 3, 2005

Related U.S. Application Data

(63) Continuation of application No. 09/703,323, filed on Oct. 31, 2000, now abandoned.

(51) Int. Cl.
*H04N 5/222* (2006.01)
*G03B 17/18* (2006.01)

(52) U.S. Cl. .............................. 348/333.01; 348/333.12; 396/282

(58) Field of Classification Search ............ 348/333.01, 348/333.02, 333.12; 396/282, 374, 51
See application file for complete search history.

(56) References Cited

U.S. PATENT DOCUMENTS

| 5,933,130 | A  | 8/1999  | Wagner            |
| 6,329,968 | B1 | 12/2001 | Cornelissen et al.|
| 6,411,306 | B1 | 6/2002  | Miller et al.     |
| 6,563,542 | B1 | 5/2003  | Hatakenaka et al. |
| 2002/0050974 | A1 | 5/2002 | Rai et al.        |

FOREIGN PATENT DOCUMENTS

| JP | 02-288472   | 11/1990 |
| JP | 05-284393   | 10/1993 |
| JP | 05-292364   | 11/1993 |
| JP | 08-242398   | 9/1996  |
| JP | 09-214814   | 5/1997  |
| JP | 2000-050131 | 2/2000  |

*Primary Examiner*—James M. Hannett
*Assistant Examiner*—Kelly L Jerabek (57) ABSTRACT

A digital camera includes a LCD that has a back light whose intensity level is set at a point midway between a maximum intensity setting and a minimum intensity setting. The back light level is then adjusted automatically from this default setting to a brightness level that corresponds to a measured scene level. The back light intensity level and contrast level of the LCD then change automatically thereafter to correspond to the measured scene level whereby the LCD controls are adjusted according to the lighting environment.

3 Claims, 7 Drawing Sheets

DIGITAL CAMERA THAT AUTOMATICALLY ADJUSTS LCD BRIGHTNESS ACCORDING TO AMBIENT LIGHT

This application is a continuation of U.S. patent application Ser. No. 09/703,323, filed: Oct. 31, 2000 now abandoned, entitled "Illuminated Display And Method Of Using Same."

TECHNICAL FIELD

The present invention relates to a illuminated display unit and method of using the display and more particularly relates to a method of using a liquid crystal display unit in a digital camera under a variety of photographic lighting conditions.

BACKGROUND ART

In modern day digital cameras, the viewing of the scene that will be captured is accomplished with either an optical viewfinder or a liquid crystal display (LCD) unit either alone or in combination with an optical viewfinder. In most, if not in all digital cameras, the intensity level or brightness level of the LCD is manually adjustable to accomodate for standard photographic lighting conditions. That is a middle of the road approach is taken to accomodate for both indoor and outdoor lighting conditions.

Besides the viewing of a scene with the LCD, the LCD also accomplishes two other primary purposes by displaying menu selections for enabling the user to control or set up camera operating conditions, and to display camera status information whenever a user is ready to capture an object image or has in fact captured an object image. While the LCD is able to perform these various function in general lighting conditions, all too often due to overly bright or dim ambient light conditions, the image displayed on the LCD is either too bright or too dim thereby greatly hindering a user in properly operarting the camera.

One attempt at solving this problem has been to provide an over-riding manual adjustment to control the backlighting of the LCD. While this approach is satisfactory in some lighting conditions, the solution has not been entirely satisfactory. In this regard, the control selection for over-riding the default backlighting condition is generally found in a buried camera menu item that must be display on the LCD. Since the menu selection item must be displayed to be selected, often times it is difficult or entirely impossible to display the menu item so that it may be clearly viewed by a user due to the ambient lighting conditions.

Therefore it would be highly desirable to have a new and improved digital camera that includes an LCD that operates in a variety of photographic lighting conditions ranging from poorly illuminated indoor settings to brightly illuminated outdoor settings.

SUMMARY OF THE INVENTION

A digital camera includes a LCD that has a back light level that is set at a point midway between a maximum intensity setting and a minimum intensity setting. The back light level is then adjusted automatically from this default setting to a brightness level that corresponds to a measured scene level. The back light intensity level then and contrast level are changed automatically thereafter to correspond to the measured scene level.

BRIEF DESCRIPTION OF THE DRAWINGS

The above mentioned features of the present invention and the manner of attaining them will become apparent and the invention itself will be best understood by reference to the following description of the preferred embodiment of the invention, in conjunction with the accompanying drawings, wherein.

DETAILED DESCRIPTION OF THE PREFERRED EMBODIMENT

Figure 1:
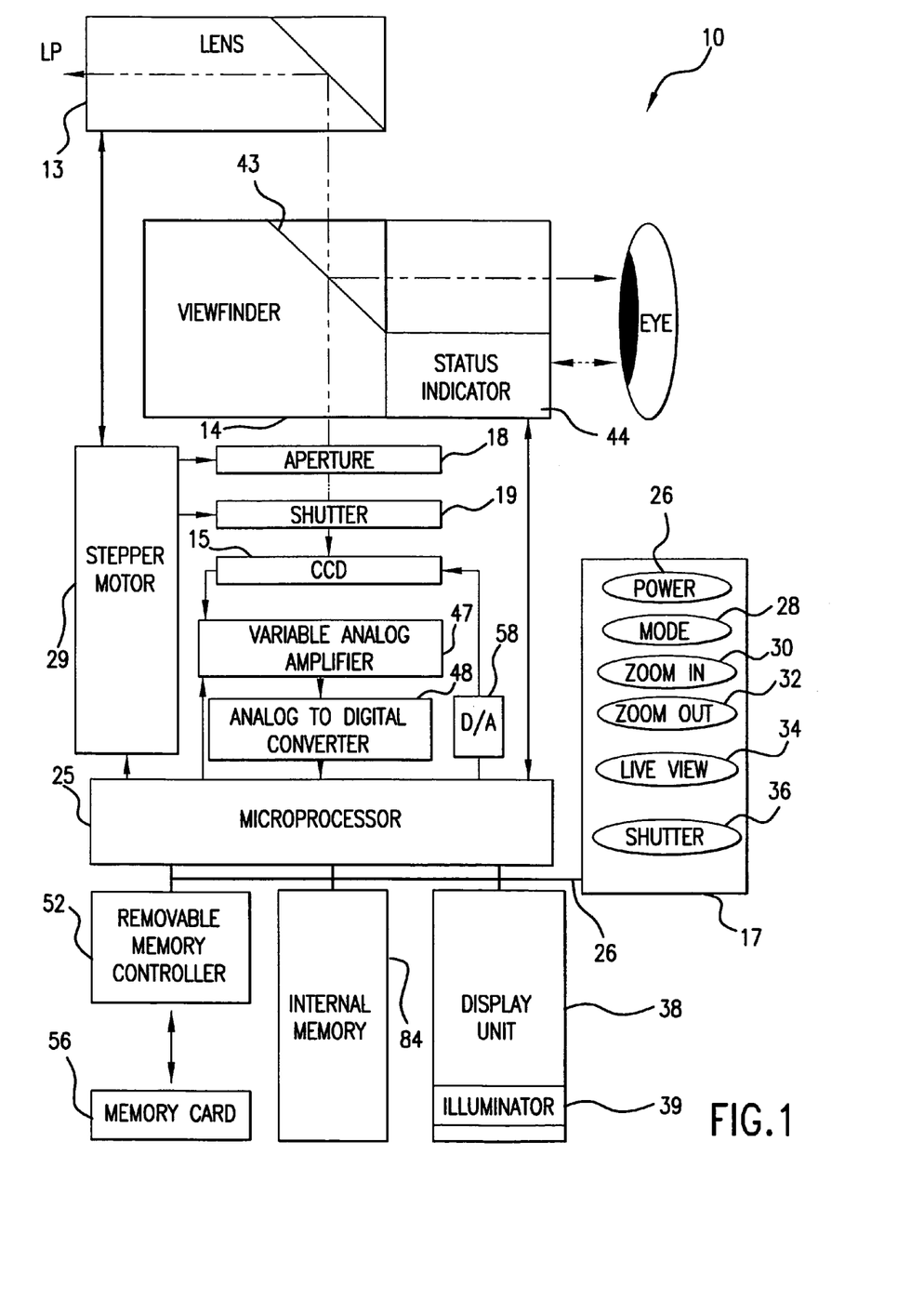
FIG. 1 is a block diagrammatic representation of the digital camera of FIG. 1.
Figure 2:
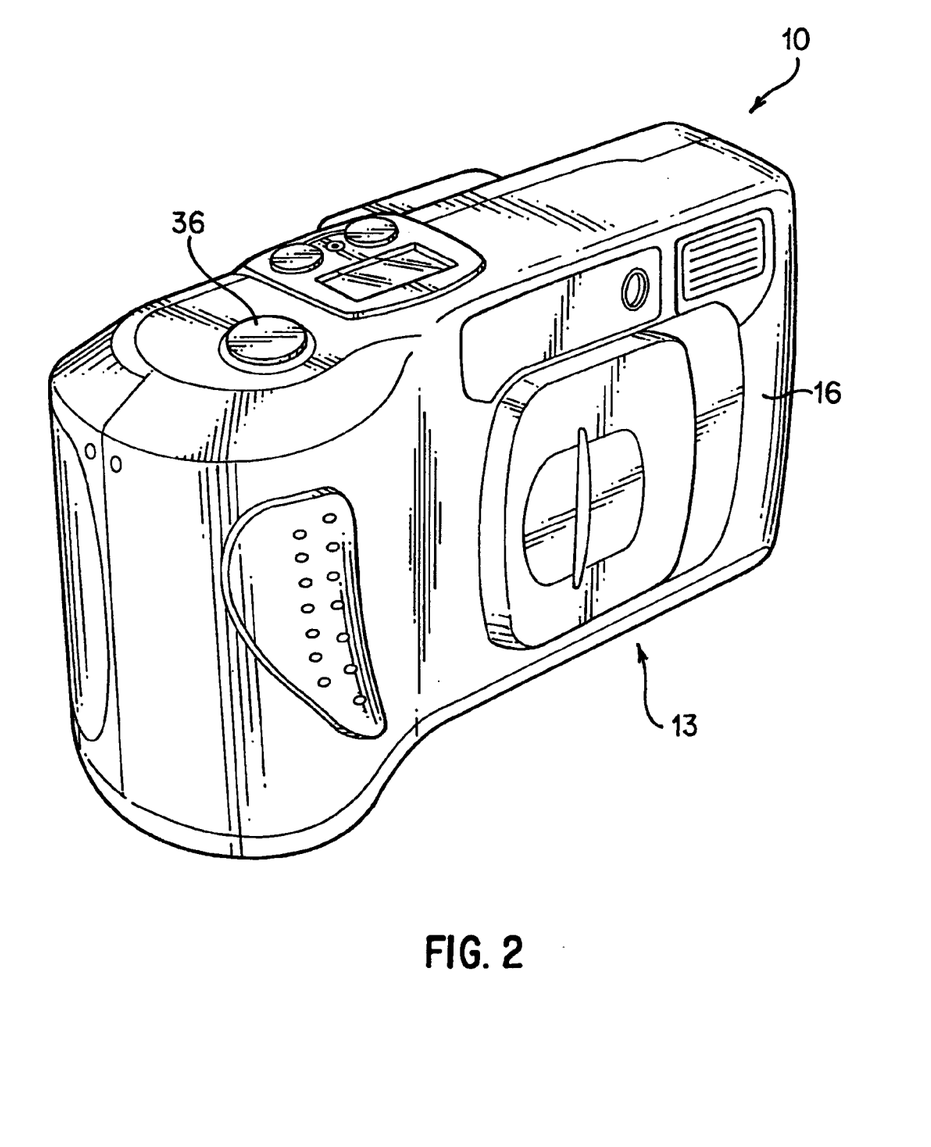
FIG. 2 is a pictorial view of a digital camera which is constructed in accordance with the preferred embodiment of the present invention.

Referring now to the drawings and more particularly to FIGS. 1-2 thereof there is shown a digital camera 10 which is constructed in accordance with the present invention. The digital camera 10 is a portable device that operates in a variety of lighting conditions ranging from poorly illuminated indoors lighting situations to brightly illuminated outdoors lighting situations.

Considering the camera 10 in greater detail with reference to FIGS. 1-2, the camera 10 generally includes a housing 16 having mounted therein a lens system or arrangement 13 that helps facilitate directing the light reflecting from an object to be captured to the photosensitive plane of the camera 10. In order to help a user frame the object to be captured, the camera 10 also includes an optical viewfinder 14 having a dichroic mirror 43 and a status indicator 44 that enables a user to visualize a through the lens scene while simultaneously viewing status information regarding the camera 10.

In order to help limit the amount of light that is communicated to the photosensitive plane of the camera, the camera 10 further includes an aperture 18 that is automatically adjusted by a microprocessor 25 via a stepper motor 29. In this regard, the stepper motor 29 is coupled electrically to the microprocessor 25 and coupled mechanically to the aperture 18 in order to facilitate receiving the proper amount of light to assure proper image formation.

As best seen in FIG. 1, a shutter 19 is sandwiched between the aperture 18 and the photosensitive plane of a charged couple device (CCD) 15 that converts light into an electrical signal that is indicative of the object framed within the optical viewfinder 14. The shutter 19 is also coupled to the stepper motor 29 to further facilitate controlling the amount of light that is allowed to fall on the CCD 15 for light converting purposes. To help control the strength of the electrical signal passing from the CCD 15 to the microprocessor 25, the camera 10 further includes a gain control device, such as an variable gain operational amplifier 47, whose output is connected to an analog to digital converter 48. The analog to digital converter 48 converts the analog signal passing from the output of the gain control device 47 into a digital signal of an acceptable level for processing by the microprocessor 25. A digital to analog converter 58 is coupled electrically between the microprocessor 25 and the gain control 47 to enable the microprocessor 25 to control the strength of the output signal that will be converted by the analog to digital converter 48. As will be explained hereinafter in greater detail, the microprocessor 25 operates under a set of control programs that are stored in an internal memory device, such as random access memory (RAM) module 84.

The digital camera 10 further includes a memory controller 52 that operates under the control of the microprocessor 25 for facilitating the permanent storage of each object image captured by the camera 10. In this regard, the memory controller 52 is adapted to receive a removable memory card 56 that functions to store the object images captured by the camera 10.

In order to enable the user to visualize images in either a live view mode of operation or in a review mode of operation (relative to images previously stored on the removable memory card 56), the digital camera 10 also includes a display unit, such as a liquid crystal display (LCD) unit 38. The LCD 38 is coupled to the microprocessor 25 via an internal bus 26 which also allows for buffering of images to the LCD 38 from a set of internal buffer registers forming part of the microprocessor 25. The LCD 38 has a backlight 39 that is controlled by an LCD brightness/contrast control program 300 that will be described hereinafter in greater detail. For the moment it will suffice to indicate that the blacklight level of the LCD 38 is controlled to correspond to a measure ambient light level that is determined during the auto-exposure sequencing of the camera 10.

The digital camera 10 further includes a user interface 17 having a set of control switches that includes a power on/off switch 26, a mode selection switch 28, a zoom in switch 30, a zoom out switch 32 a live view switch 34 and a shutter actuation switch 36. The function of each of the switches will be described hereinafter in greater detail where relative.

Figure 3:
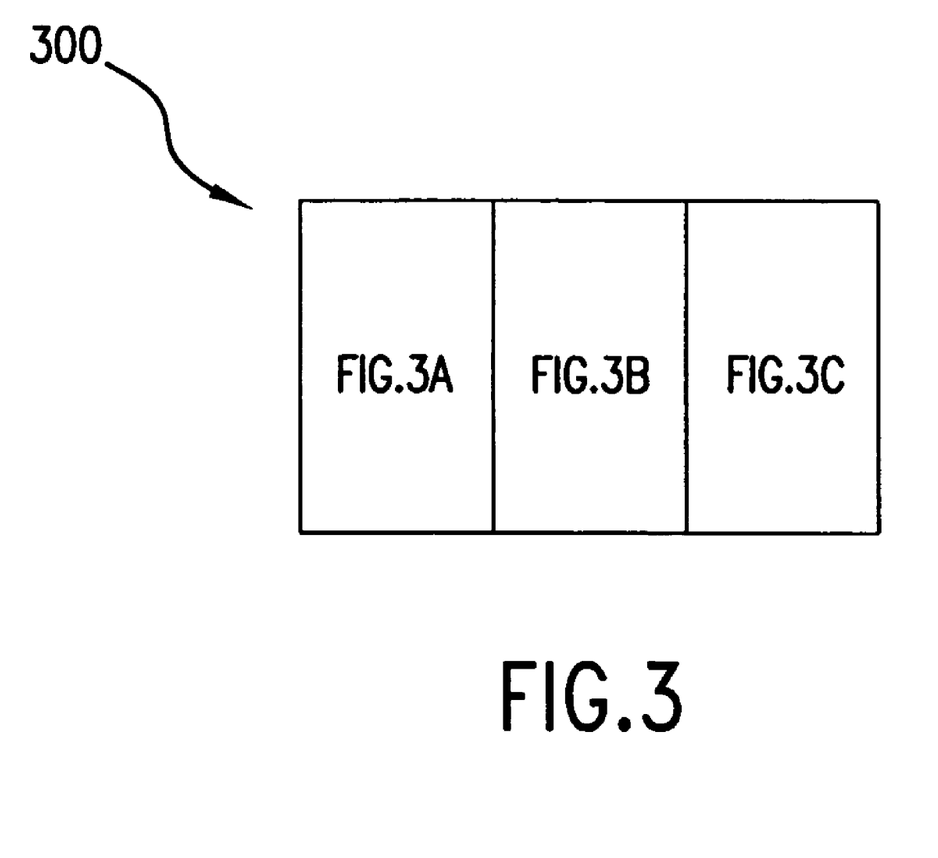
FIG. 3 is high level flowchart of a control algorithm utilized to help set the brightness level setting of the LCD forming part of the digital camera of FIG. 1.

Considering now the LCD brightness/contrast control program 300 in greater detail with reference to FIG. 3, the control program 300 begins whenever the user actuates the power switch 26. In this regard, the control program begins at a start command 302 and proceeds to a command step 304 that sets a POWER OFF flag equal to a logical zero.

From the command step 302, the program advances to a command step 306 that sets the $LCD_{CONTRAST}$ to a default contrast level $DEFAULT_{CONTRAST}$. Next the program proceeds to a command step 308 that sets the $LCD_{BRIGHT}$ to a default brightness level $DEFAULT_{BRIGHT}$. From the foregoing it should be understood by those skilled in the art, that the brightness level and the contrast level of the LCD 38 are set to default levels which are located between maximum and minimum levels.

After the command step 308 is executed, the program goes to a decision step 310 to determine whether the user has placed the camera 10 in the capture mode of operation using the mode selection switch 28. If this condition is true, the program goes to a command step 350 (FIG. 3B) that will be described hereinafter in greater detail. If this condition is not true, the program advances to a decision step 312 to determine whether the user has placed the camera 10 in a review mode of operation utilizing the mode selection switch 28.

If a determination is made at decision step 312 that the camera 10 is operating in a review mode of operation, the program proceeds to a decision step 323 (FIG. 3C) that will be described hereinafter in greater detail. Otherwise, the program advances to a decision step 314 to determine whether the user has placed the camera in a connect mode of operation using the mode selection switch 28. If the user has not actuated the mode selection switch 28 to place the camera 10 in the connect mode of operation, the program proceeds to a decision step 318 to determine whether the user has actuated the power switch 26 to power down the camera 10.

If the user has actuated the power switch 26, the program goes to an exit command step 321 and exits the subroutine 300. If the user has not actuated the power switch 26, the program proceeds to a decision step 319 to determine whether the internal time out period of the camera 10 has elapsed. If the time out period has elapsed, the program goes to the exit command 321 and proceeds as described previously. Otherwise, the program advances to the decision step 310 and continues as described previously.

Considering again the decision step 314, if the user has placed the camera 10 in the connect mode of operation, the program advances to a command step 311 that causes the LCD contrast level to be set equal to the default contrast level. Next the program continues to a command step 313 that causes the LCD brightness level to be set to the default brightness level.

The program then advances to a command step 315 that sets up the brightness level to use the LCD setting when displaying messages on the LCD 38.

From the command step 315 the program proceeds to a determination step 316 to determine whether the camera 10 is busy. If the camera 10 is not busy, the program goes to a command step 317 that will be described hereinafter in greater detail. Otherwise, if the camera 10 is busy, the program returns to step 315 and proceeds as described previously.

From the foregoing, it should be understood that the default setting for the LCD are activated at the command step 315 for displaying messages on the LCD 38. The program then proceeds from the command step 315 to to a command step 317 that causes the $POWER_{OFF}$ flag to be set to a logical zero. After setting the $POWER_{OFF}$ flag, the program continues to the decision step 318 and proceeds as described previously.

Figure 3A:
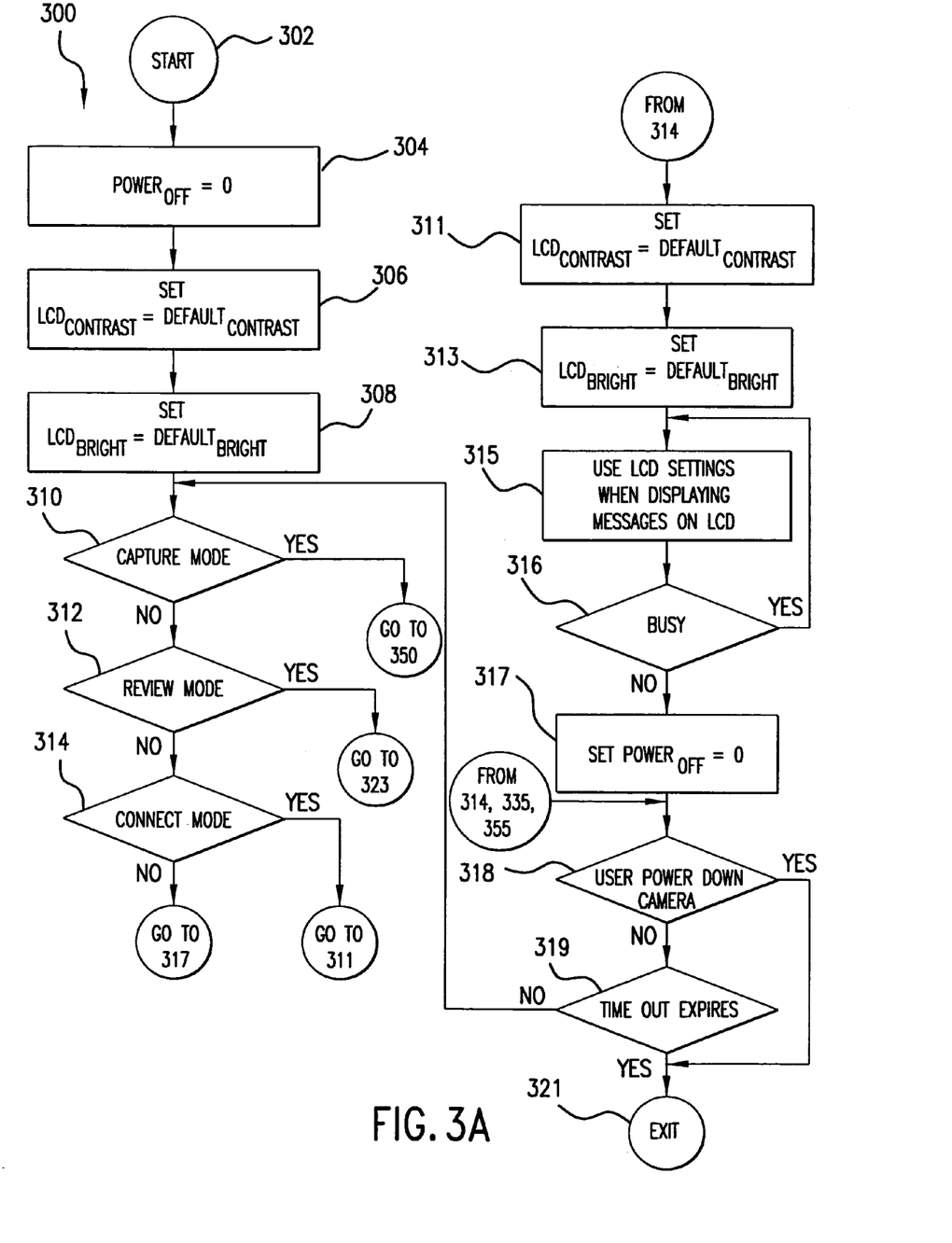
Figure 3B:
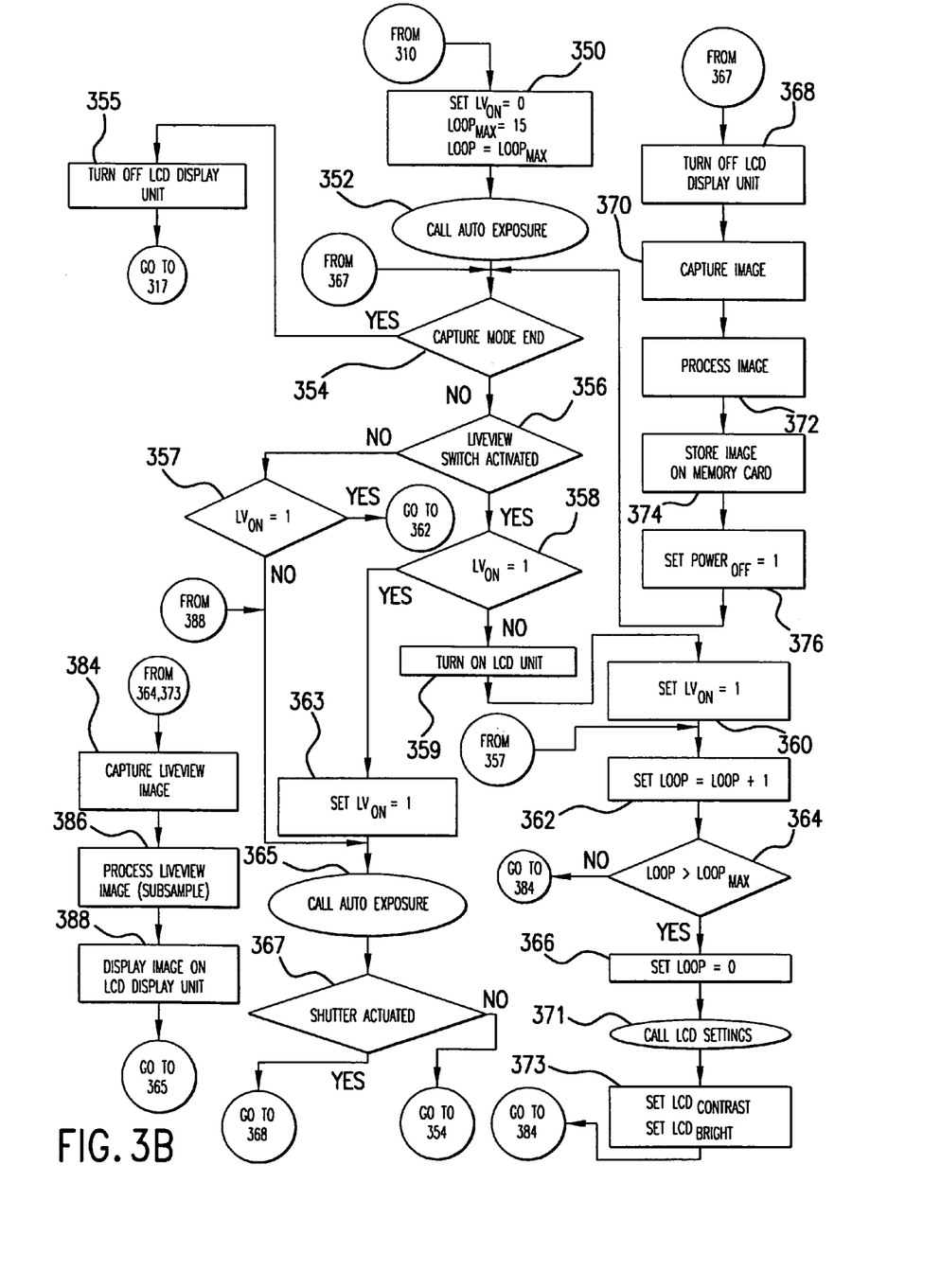

Considering now the command step 350 in greater detail with reference to FIG. 3B, the command step 350 set a back light on value ($LV_{ON}$) to a logical zero, live view is off, a loop maximum flag to a logical zero, and a loop flag to a logical zero. $LV_{ON}$ indicates the status of the live view mode where $LV_{ON}=1$ is active and $LV_{ON}=0$ is inactive. The term $LOOP_{MAX}$ means skip n number of frames in the live view mode before recalculating the display settings. In this regard, the typical frame rate in the live view mode is about 30 frames per second. Therefore $LOOP_{MAX}$ would be selected to be 15 frames so the brightness and contrast would be adjusted twice per second. More specifically it is not necessary to update the display settings in the live view mode in each frame as the scene brightness does not change that rapidly.

After execution of command step 350, the program proceeds to a call command step 352 that causes an auto-exposure subroutine to be executed, such as the auto exposure subroutine described in U.S. patent application Ser. No. 09/661,883. After the auto-exposure subroutine is executed, the program returns to the step, a decision step 354 to determine whether the user has utilized the mode selection switch 28 to place the camera 10 in other than the capture mode of operation. If this condition is true, the camera advances to a command step 355 that causes the LCD unit 38 to turn off in order to conserve camera power. After executing command step 355 the camera goes to decision step 318 and proceeds as described previously.

If at decision step 354 a determination is made that the camera 10 is still operating in the capture mode of operation, the program advances to a decision step 356 to determine whether the user has activated the live view mode switch 34. If a determination is made that the user has activated the liveview switch 34, the program goes to a decision step 358 that will be described hereinafter in greater detail. Otherwise the camera goes to a decision step 357 to determine whether if live view is currently on. If $LV_{ON}$ has been set to logical one level, the program proceeds to a command step 362 that will be described hereinafter in greater detail. Otherwise, the program goes to a call step 365 that causes the auto-exposure subroutine to be called.

After the auto-exposure subroutine has been executed the program returns and EV value and continues to a decision step 367 to determine whether the user has actuated the shutter switch 36. If the shutter switch 36 has not been actuated, the program returns to the decision step 354 (FIG. 3B) and proceeds as described previously. If the shutter switch 36 has been actuated, the program advances to a command step 368 that turns power off of the LCD 38 in order to preserve camera power. Once command step 368 is executed the program proceeds to a command step 370 that causes the CCD 15 to capture the object image framed by the viewfinder 14.

Once the object image has been captured, the program goes to a process command step 372 that causes the microprocessor 25 to process the captured image for storage purposes. Next the program goes to a store command step 374 that causes the processed image to be stored on the removable memory device 56. After the image is stored, the program advances to a command step 376 that causes the $POWER_{OFF}$ flag to be set to a logical one level. It should be understood by those skilled in the art that after an image is captured and then reviewed there is no immediate need to change the display settings. On the other hand, if the user is reviewing stored images while $POWER_{OFF}=0$ then base the display settings on the image settings when the image was originally captured. The program then returns to the decision step 354 and proceeds as described previously.

Considering now the decision step 358 in greater detail with reference to FIG. 3B, if $LV_{ON}$ is not set to a logical one, the program proceeds to a command step 359 that cause the LCD display unit to be activated. It should be understood that at step 358 since the liveview (LV) switch has been activated, LV will switch to the opposite state (off if on, on if off). Next the program proceeds to a command step 360 that set $LV_{ON}$ to a logical one. The program then proceeds to command step 362 that will be described hereinafter in greater detail. If at step 358 $LV_{ON}$ is set to a logical one, the program goes to a command step 363 that causes $LV_{ON}$ to be reset to a logical zero. From command step 363 the program goes the call step 365 and proceeds as described previously.

Considering now the command step 362 in greater detail with reference to FIG. 3B, the command step 362 causes the loop counter LOOP to be incremented by one. That is LOOP is set equal to LOOP+1. Next, the program continues to a decision step 364 to determine whether the LOOP counter is less than a maximum loop value $LOOP_{MAX}$. If this condition is not true, the program advances to a command step 384 (FIG. 3B) that will be described hereinafter in greater detail. If the condition is true, the program proceeds a command step 366 that set LOOP equal to a logical zero. Next the program advances to a call command 371 that causes a LCD setting subroutine 400 to be executed as will be described hereinafter in greater detail. After the subroutine 400 is executed the program returns and continues to a command step 373 that set the contrast level of the LCD 38 equal to a current $LCD_{CONTRAST}$ level and sets the $LCD_{BRIGHT}$ level to the current brightness level. The program then advances to a command step 384 (FIG. 3B) that will be described hereinafter in greater detail.

Considering now the command step 384 in greater detail with reference to FIG. 3B, the command step 384 causes a live view image to be captured. The captured live view image is then processed or subsampled at a command step 386. Next, the program advances to a command step 388 that causes the captured and processed live view image to be displayed on the LCD 38. The program then goes to call command 365 and proceeds as described previously.

Figure 3C:
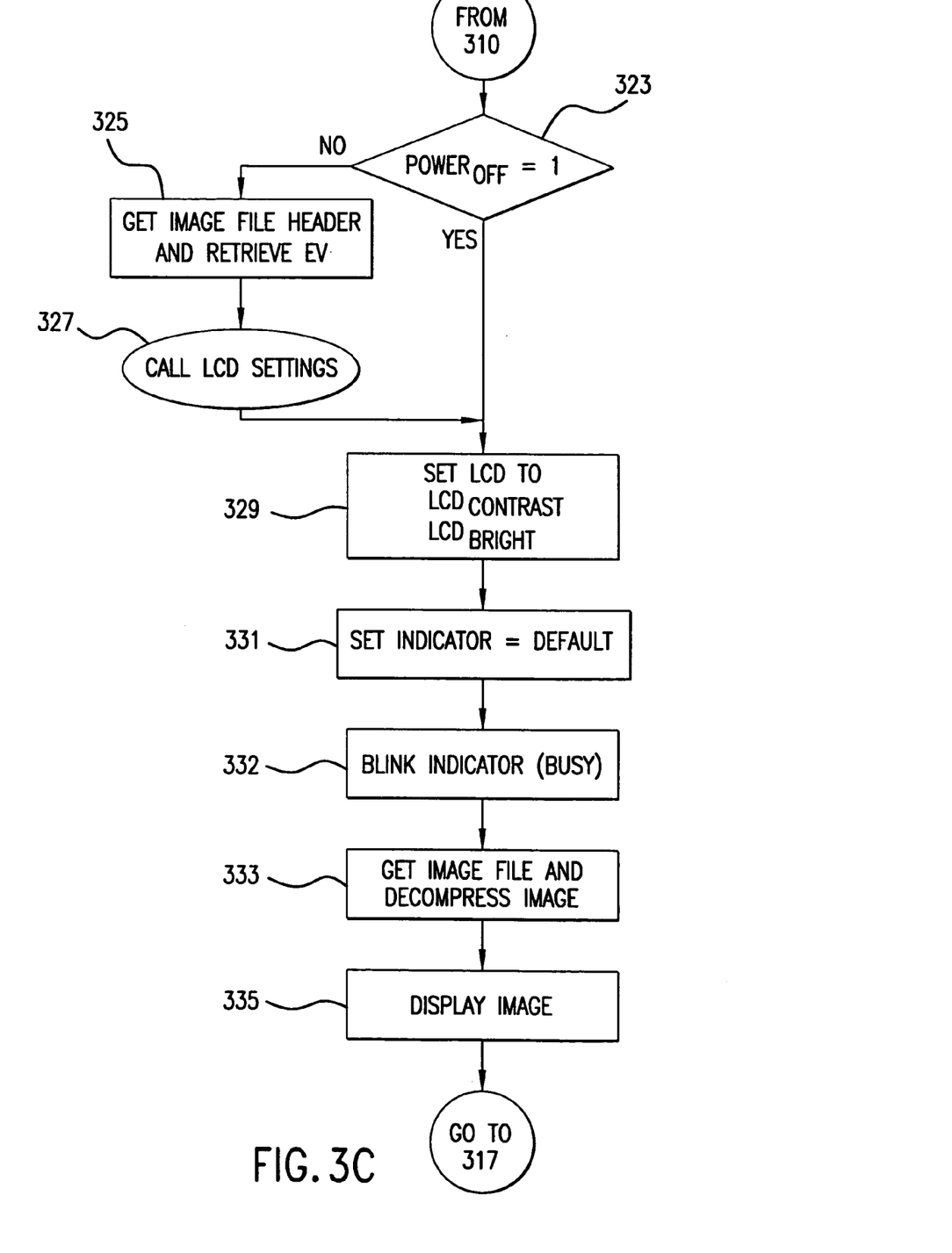

Considering now the decision step 323 as advanced to from decision step 312 in greater detail with reference to FIG. 3C, the decision step 323 determines whether the $POWER_{OFF}$ flag has been set to a logical one. If this condition is not true, the program goes to a command step 325 that causes the microprocessor 25 to access a file header and then retrieve from the file the EV value. Once the command step 325 has been executed the program goes to a call command 327 that calls the LCD setting subroutine 400 that will be described hereinafter in greater detail. After the subroutine 400 is executed, the program returns and continues to a command step 329 that will be described hereinafter in greater detail.

If a determination is made at decision step 323 that the $POWER_{OFF}$ flag is set to a logical one (indicating that power was not turned off between capturing an image and review the image), the program advances to the command step 329. Command step 329 sets the LCD brightness and contrast levels to $LCD_{BRIGHT}$ and $LCD_{CONTRAST}$ respectively. Next, the program goes to a command step 331 that set the illumination level of the status indicator 44 to its default level. From step 331 the program proceeds to a command step 332 that causes the status indicator 44 to blink to provide and indication to the user that the camera 10 is busy processing an image.

Next the program goes to a command step 333 that causes the microprocessor 25 to retrieve an image file and decompress the image for display purposes. In this regard, after the image has been decompressed the program goes to a command step 335 that causes the decompressed image to be displayed on the LCD 38. The program then returns to step 318 (FIG. 3A) and proceeds as described previously.

Figure 4:
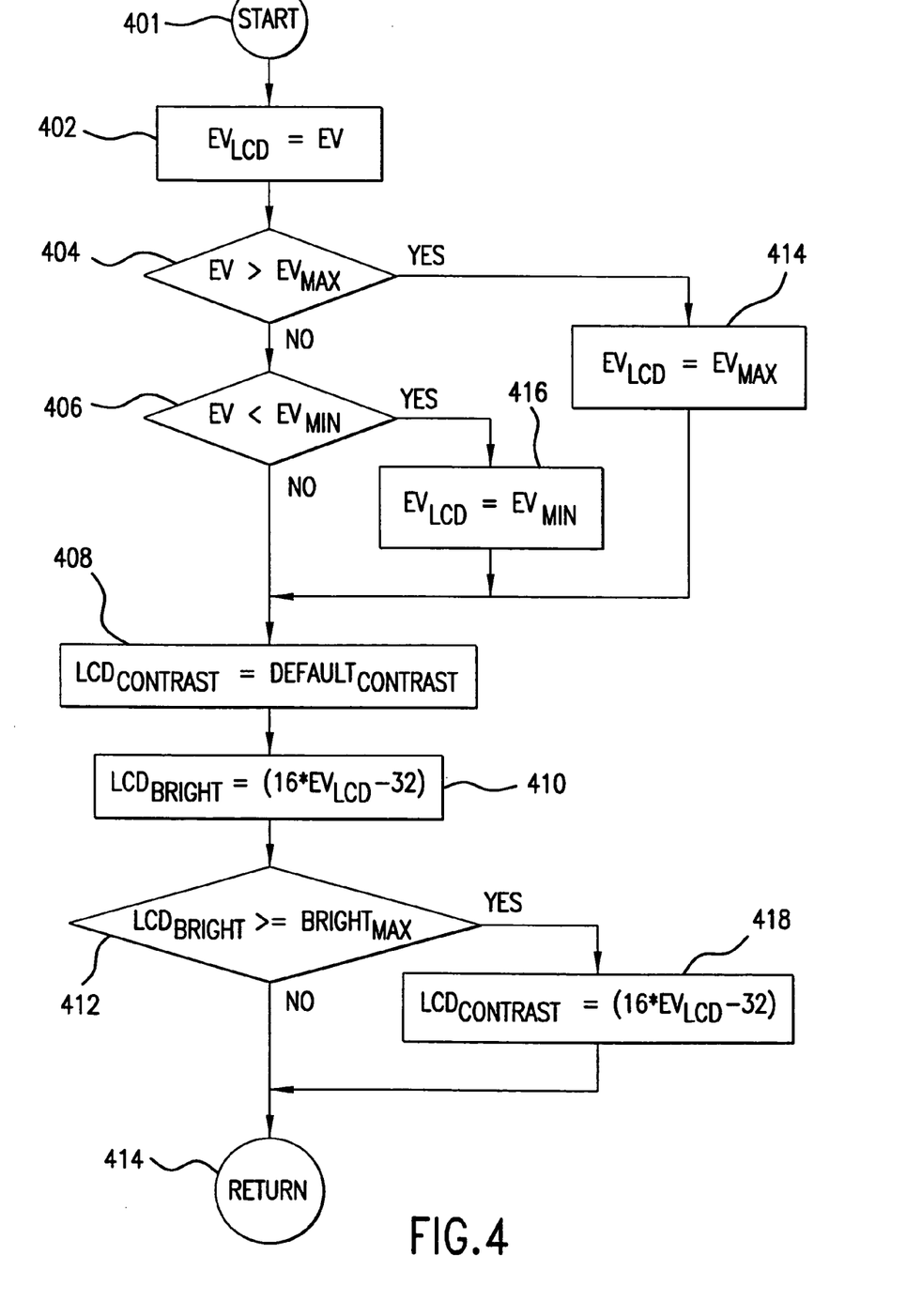
FIG. 4 is a high level flowchart of a determination algorithm to calculate the brightness level of the LCD forming part of the digital camera of FIG. 1.

Considering now the LCD setting subroutine 400 in greater detail with reference to FIG. 4, the subroutine is executed in response to the call commands at steps 327 (FIG. 3C) or 371 (FIG. 3B) respectively. After the subroutine 400 is executed the program returns to the next step following the call command that caused the subroutine 400 to commence. In any event, the subroutine 400 begins at a start command 401 and proceeds to a command step 402 that causes $EV_{LCD}$ to be set to EV. Next the program advances to a decision step 404 to determine whether EV is greater than $EV_{MAX}$. If this condition is determined, the program proceeds to a command step 414 that sets $EV_{LCD}$ to $EV_{MAX}$. The program then goes to a command step 408 that will be described hereinafter in greater detail.

If a determination is made at decision step 404 that EV is not greater than $EV_{MAX}$, the program proceeds to a decision step 406 to determine whether EV is less than $EV_{MIN}$. If this condition is determined, the program goes to a command step 416 that causes $EV_{LCD}$ to be set to $EV_{MIN}$. After setting the EV value to the minimum value the program proceeds to the command step 408. If a determination is made at decision step 408 that EV is not less than the $EV_{MIN}$ then the program goes directly to the command step 408.

Considering now the command step 408 in greater detail, the command step 408 causes the $LCD_{CONTRAST}$ to be set to a default value or $DEFAULT_{CONTRAST}$. Next the program goes to a command step 410 that sets the $LCD_{BRIGHT}$ level equal to (16* $EV_{LCD}$−32) in order to map EV into a digital word representing the $LCD_{BRIGHT}$. The program then goes to a decision step 412 to determine whether $LCD_{BRIGHT}$ is equal to or greater the maximum brightness level or $BRIGHT_{MAX}$.

If a determination is made at step 412 that $LCD_{BRIGHT}$ is greater than or equal to the maximum brightness level the program advances to a command step 418 that set $LCD_{CONTRAST}$ equal to $(16*EV_{LCD}-32)$. This value is selected since the LCD backlight brightness level is at maximum and the only way to increase apparent display brightness is to decrease the display contrast; i.e. the more washed out colors displayed appear brighter on the LCD 38. The program then goes to a return command 420 that returns the program to the subroutine 300 as mentioned earlier.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

I claim:

1. A digital camera, comprising:
   an image processing system for capturing, processing and storing images;
   a liquid crystal display unit for displaying images;
   a control algorithm for measuring ambient light reflecting from an object in proximity to said liquid crystal display unit; and
   another control algorithm responsive to said control algorithm for adjusting a back light level of said liquid crystal display unit to a determined ambient light level for facilitating viewing of images displayed on said liquid crystal display;
   a brightness algorithm for determining when said back light level is at a maximum level; and
   a contrast algorithm responsive to said brightness algorithm for automatically adjusting a contrast level of said liquid crystal display to a predetermined level when said back light level is at said maximum level to further facilitate viewing of image and textual information displayed on said liquid crystal display;
   wherein said brightness algorithm determines a default brightness midway between a maximum brightness level and a minimum brightness level; and
   wherein said contrast algorithm adjusts said contrast level to a default contrast level corresponding to said default brightness level whenever said liquid crystal display unit is displaying camera status information and not an object image.

2. A digital camera, comprising:
   an image processing system for capturing, processing and storing images;
   a liquid crystal display unit for displaying images;
   a control algorithm for measuring ambient light reflecting from an object in proximity to said liquid crystal display unit; and
   another control algorithm responsive to said control algorithm for adjusting a back light level of said liquid crystal display unit to a determined ambient light level for facilitating viewing of images displayed on said liquid crystal display;
   a brightness algorithm for determining when said back light level is at a maximum level;
   a contrast algorithm responsive to said brightness algorithm for automatically adjusting a contrast level of said liquid crystal display;
   wherein said brightness algorithm determines a default brightness midway between a maximum brightness level and a minimum brightness level;
   wherein said contrast algorithm adjusts said contrast level to a default contrast level corresponding to said default brightness whenever said liquid crystal display unit is displaying camera status information and not an object image; and
   wherein said contrast algorithm adjusts said contrast level to an adjusted contrast level whenever said brightness algorithm determines that said back light is at a maximum level.

3. A digital camera according to claim 2, wherein said adjusted contrast level is a maximum contrast level.

* * * * *